United States Patent
Arora

(10) Patent No.: US 7,624,036 B2
(45) Date of Patent: Nov. 24, 2009

(54) CHANGE MANAGEMENT ANALYSIS AND IMPLEMENTATION SYSTEM AND METHOD

(76) Inventor: Nigam Arora, 9652 Bayview Ct., Indianapolis, IN (US) 46256

( * ) Notice: Subject to any disclaimer, the term of this patent is extended or adjusted under 35 U.S.C. 154(b) by 1183 days.

(21) Appl. No.: 10/319,083

(22) Filed: Dec. 13, 2002

(65) Prior Publication Data
US 2004/0117237 A1    Jun. 17, 2004

(51) Int. Cl.
*G06F 17/30* (2006.01)
(52) U.S. Cl. .................. 705/10; 705/1; 705/7
(58) Field of Classification Search .......... 705/1, 705/7, 10
See application file for complete search history.

(56) References Cited

U.S. PATENT DOCUMENTS

| | | | | |
|---|---|---|---|---|
| 5,233,513 | A * | 8/1993 | Doyle | 705/7 |
| 6,321,205 | B1 * | 11/2001 | Eder | 705/7 |
| 6,871,182 | B1 * | 3/2005 | Winnard et al. | 705/7 |
| 6,996,601 | B1 * | 2/2006 | Smith | 709/203 |
| 7,003,502 | B1 * | 2/2006 | Wizdo et al. | 706/45 |
| 7,035,809 | B2 * | 4/2006 | Miller et al. | 705/8 |
| 2002/0103805 | A1 * | 8/2002 | Canner et al. | 707/100 |
| 2003/0018487 | A1 * | 1/2003 | Young et al. | 705/1 |
| 2003/0084015 | A1 * | 5/2003 | Beams et al. | 706/47 |
| 2004/0034543 | A1 * | 2/2004 | Bartsch | 705/1 |

OTHER PUBLICATIONS

Ozok et al. "Measureing consistency of web page design and its effects on performance and satisfaction," School of lnudstrial Engineering, Purdue University. Ergonomics, 2000, vol. 43, No. 4, p. 443-460.*

Ozok et al. "Measureing consistency of web page design and its effects on performance and satisfaction," School of lnudstrial Engineering, Purdue University. Ergonomics, 2000, vol. 43, No. 4, p. 443-460.*

(Continued)

*Primary Examiner*—Bradley Bayat
*Assistant Examiner*—Johnna Loftis

(57) ABSTRACT

The present invention involves an analytical method of providing change management statistics in an organization which includes a plurality of individuals. The method involves the steps of: creating a survey including a plurality of questions relating to the subjects of Planning, Execution of the planning, and Persons responsible for the execution of the planning; obtaining responses to the plurality of questions from the individuals in the organization; and calculating at least one index relating to at least two of the subjects. The step of creating a survey includes creating questions on Planning which relate to vision, strategy and desired results; questions on Execution which relate to readiness, ambition, knowledge, ability and momentum; and questions on Persons which relate to least one of conditioning, fear, trust and inductivity. The step of obtaining responses includes a step of dividing the individuals in the organization into groups having one or more group members. The questions elicit information from each group member in the form of responses indicative of the opinion of the respondent on at least one of the subjects of vision, strategy, desired results, readiness, ambition, knowledge, ability, momentum, conditioning, fear, trust and inductivity. The step of creating a survey includes creating at least one question relating to a general opinion relating to the entire organization and at least one question relating to a specific opinion relating the respondent individual of the organization.

28 Claims, 1 Drawing Sheet

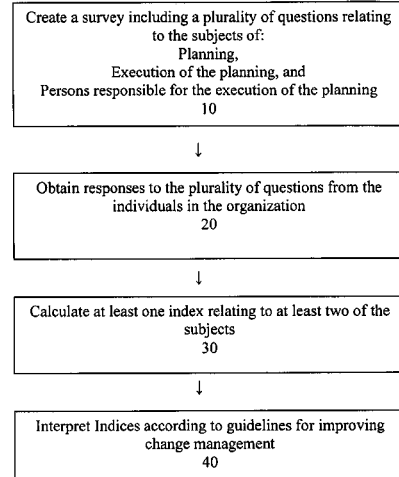

OTHER PUBLICATIONS

Baker, Sunny and Kim. Idiot's guide to Project Management. Second Edition. copyright 2000.*

Byars, Lloyd. Strategic Management Planning and Implementation concepts and cases. Second Edition. copyright 1987.*

Huizing, Ard; Koster, Esther; Bouman, Wim. Balance in business reengineering: An empirical study of fit and performance. Journal of Management INformaiton Systems: JMIS v14n1 pp. 93-118 Summer 1997.*

Thompson, Gerald; Holland, Winford. Managing Change is Critical. Energy Markets; Oct. 2001; 6, 10, ABI/Inform Trade and Industry p. 80.*

* cited by examiner

Figure 1

Create a survey including a plurality of questions relating to the subjects of:
Planning,
Execution of the planning, and
Persons responsible for the execution of the planning
10

Obtain responses to the plurality of questions from the individuals in the organization
20

Calculate at least one index relating to at least two of the subjects
30

Interpret Indices according to guidelines for improving change management
40

CHANGE MANAGEMENT ANALYSIS AND IMPLEMENTATION SYSTEM AND METHOD

BACKGROUND OF THE INVENTION

1. Field of the Invention

The invention relates to management of business organizations. More specifically, the field of the invention is that of change evaluation systems for business management planning and implementation.

2. Description of the Related Art

Machiavelli was right. Since his time, the world has become infinitely more complex and the pace of change has accelerated by orders of magnitude. So has the difficulty in succeeding at change.

There is no progress without change. The nature of change itself keeps on changing. Linear change no longer serves the objectives of a progressive organization. The notion of slow incremental change is typically in conflict with the overriding challenges. Today, change is fierce and ferocious. Impact of change these days is much broader and deeper than ever before in history.

Mergers and acquisitions, growth, competition, deregulation, globalization, changing market conditions, new technologies—whatever the drivers of change in a particular situation may be, the leaders are constantly faced with managing change successfully. Prosperity and sometimes even survival of their organizations depends on their success at change management.

The leaders who have managed major change know how difficult, complex and consuming succeeding at creating change can be. Those who have not been through a major change initiative may think of the above statement as exaggeration.

On the surface, public admission of failure of a change initiative is rare, but the brutal fact is that 70% of all change initiatives fail or produce only middling results. The initial question is why do so many change programs not produce excellent results? The question is especially critical in today's rapid fire business environment.

SUMMARY OF THE INVENTION

The present invention is a change analysis system and method which allows business management to evaluate, plan, and implement successful business changes. By measuring human beliefs and behaviors, and analyzing these measured quantities, in three dimensions (termed dimensions "ZYX"), the present invention accesses an organization's tendencies and can assist in developing management solutions to problems created by change. The methodology involves creating a survey including a plurality of questions relating to the subjects of Planning, Execution of the planning, and Persons responsible for the execution of the planning. Obtaining the responses to the plurality of questions from the individuals in the organization, the invention provides for calculating at least one index relating to at least two of the subjects.

ZYX analysis explains real reasons behind change initiative failures, explains hidden truths of basic human nature, makes visible what is not visible on the surface and ties new innovations in a practical framework to successfully manage change.

Unique Analytical Measurements and wide ranging Numerical Indices that are quintessential to ZYX analysis not only instill strong discipline in Change Management but also act as early predictors of future results long before data on results shows up in normal business statistics.

ZYX analysis states that to be successful at Change Management, the Change Management program must comply to the following requirements:

Think of Change in three dimensions and organize Change in three dimensions. The three dimensions are pictorially represented as the three Axes: the Z Axis, the Y Axis and the X Axis. The Z Axis is the Planning Axis and consists of three elements. The Y Axis is the Execution Axis and consists of five elements. The X Axis is the People Axis and consists of four elements.

Ignore all other dimensions and elements with the exception of the three Axes and their twelve elements.

The elements of Z Axis are: Vision, Strategy, and Desired Results.

The elements of Y Axis are: Readiness, Ambition, Knowledge, Ability, and Momentum.

The elements of X Axis are: Conditioning, Fear, Trust, and Inductivity.

Z Axis is the starting point.

All elements of Z Axis are best performed in the order listed i.e. Vision first, Strategy second and Desired Results last.

The elements of Y Axis are best performed in the order listed, i.e., Readiness first, Ambition second, Knowledge third, Ability fourth and Momentum last.

The elements of X Axis are best performed in the order listed i.e., Conditioning first, Fear second, Trust third and Inductivity last.

Interplay between the twelve elements of ZYX analysis is critical to Success. The interplay between the elements is both an iterative and recursive process. As a starting point, the interplay are best dealt with in the following order:

| | |
|---|---|
| VISION | STRATEGY |
| VISION | DESIRED RESULTS |
| VISION | CONDITIONING |
| VISION | FEAR |
| VISION | TRUST |
| VISION | INDUCTIVITY |
| VISION | READINESS |
| VISION | AMBITION |
| VISION | KNOWLEDGE |
| VISION | ABILITY |
| VISION | MOMENTUM |
| STRATEGY | VISION |
| STRATEGY | DESIRED RESULTS |
| STRATEGY | CONDITIONING |
| STRATEGY | FEAR |
| STRATEGY | TRUST |
| STRATEGY | INDUCTIVITY |
| STRATEGY | READINESS |
| STRATEGY | AMBITION |
| STRATEGY | KNOWLEDGE |
| STRATEGY | ABILITY |
| STRATEGY | MOMENTUM |
| READINESS | CONDITIONING |
| READINESS | FEAR |
| READINESS | TRUST |
| READINESS | INDUCTIVITY |
| AMBITION | CONDITIONING |
| AMBITION | FEAR |
| AMBITION | TRUST |
| AMBITION | INDUCTIVITY |
| KNOWLEDGE | CONDITIONING |
| KNOWLEDGE | FEAR |
| KNOWLEDGE | TRUST |
| KNOWLEDGE | INDUCTIVITY |
| ABILITY | CONDITIONING |
| ABILITY | FEAR |
| ABILITY | TRUST |
| ABILITY | CONDITIONING |
| MOMENTUM | CONDITIONING |

-continued

| | |
|---|---|
| MOMENTUM | TRUST |
| MOMENTUM | INDUCTIVITY |
| MOMENTUM | FEAR |

The details are best customized for each situation within the strict framework of ZYX analysis.

Innovative Analytical Measurements of ZYX analysis are best made before starting the Change Program to develop a baseline.

To maintain discipline in the Change Initiative, the Innovative Analytical Measurements of ZYX analysis are best made at predetermined points throughout the Change Process.

The Innovative Leading Indicators of ZYX analysis are best used to help adjust the course before the problems are even visible using conventional methods.

ZYX Analysis Elements: The Z Axis

The Vision: In addition to conventional management, ZYX analysis adds three 'must-do' new requirements.

Build the bridge between deductive thinkers (typically top executives) and inductive thinkers (typically vast majority of people.)

Systematically consider other ZYX analysis elements in the prescribed order in an iterative and recursive process.

Develop two complimentary indices: Vision Index and Vision Challenge Index.

Strategy: In addition to conventional management, ZYX analysis dictates five "must do" requirements.

Systematically consider other ZYX analysis elements in the prescribed order in an iterative and recursive process.

Avoid Organizational Behavior Change wherever possible.

Combine Theory E and Theory O.

Develop two complimentary indices: Strategy Index and Strategy Challenge Index.

Clearly separate strategy from tactics.

Desired Results: In addition to conventional management, ZYX analysis dictates that the Desired Results be developed for all of the following three categories: Financial Objectives, Strategic Objectives, and ZYX analysis Leading Indicators Objectives.

The Y Axis

Readiness: ZYX analysis states that it is best to analytically measure the Readiness of the organization and intervene if needed to make sure that Readiness is at acceptable levels before embarking on the implementation phase.

Ambition: The second step is the ambition among the people to make change happen. ZYX analysis calls for analytically measuring Collective Ambition Levels of groups and sub groups. In case the Collective Ambition levels are acceptable, the following step can be omitted. If the Collective Ambition Levels are lower than where they need to be, ZYX analysis calls for dividing the organization into four groups.

1st Group: People willing to change on their own based on senior management's efforts to get the organization ready for change.

$2^{nd}$ Group: People who are likely to change given reasonable encouragement, training and incentives.

3rd Group: People who are active against change either visibly or behind the scene.

4th Group: People who give lip service to change, but in reality, are passive bystanders and have no sincere intention of abandoning old ways.

ZYX analysis calls for separate strategies for each of the aforementioned groups.

Knowledge: ZYX analysis calls for measuring knowledge needed for Change Initiatives to Succeed after Readiness and Ambition reach acceptable levels. Intervention is needed if Knowledge Index is not at the acceptable level before proceeding further with a Change Program.

Ability: Applying the Knowledge element to actually execute change takes time, follow-up and reinforcement. Success in this element depends to a large degree on how effectively the Knowledge element is integrated with the elements of the X Axis. To rapidly facilitate the ability to actually change, elements of the X Axis must be integrated with supervision, mentoring, performance measurement, change audits and new tools.

Momentum: Once the ball is rolling, it is important to build on the momentum of change. Celebrating successes, financial rewards, recognition, constant communication, ongoing training, change audits, managers acting as role models, and terminations when objectives are not met are all a part of a cohesive Change Management Plan to maintain momentum.

Momentum Index is designed to measure Momentum of the Change Initiative.

The X Axis

Key to success of any Change Program is the people involved. Changing people is one of the toughest tasks. ZYX analysis simplifies the task by stating that only four elements are responsible for most of the success when used in the prescribed fashion.

Conditioning: ZYX analysis focuses on normal conditioning and competing conditioning both at the group level and the individual level. The lower the conditioning level, higher the propensity to change successfully.

Fear: ZYX analysis focuses on Internal Fear and External Fear both at the group level and the Individual Level. ZYX analysis presents the ideal fear zone for a Change Initiative to Succeed.

Trust: ZYX analysis states that predictability, values, repeated clear articulation at a detailed level and walking the talk are the four key ingredients of this element. Further ZYX analysis clearly lays out two paths: one path that breaks the trust and the other path that builds the trust.

Inductivity: The lower the inductivity of the individuals and the groups, the higher is the probability of success of a Change Initiative. ZYX analysis states that the majority of the people involved in a typical Change Initiative exhibit high Inductivity. ZYX analysis calls for Senior Managers to recruit people with low inductivity as Change Agents. ZYX analysis further states that rank and file Change Agents are much more effective in making the specific details understood and being credible to a wide audience.

Here are some of the initiatives where an organization can utilize ZYX analysis and succeed: Mergers & Acquisitions; Restructuring; Rapid Growth; Changes/Compliance to Regulations; Patent Expirations; New Technologies; Supply or Demand Changes; New or Revised Processes; Stagnation or Decline of Business; Loss of Customers; Cost Reduction; Need for New Innovations; Changes—Availability of Financing; Changes—Needs of the Shareholders; New or Invigorated Competition; Not Meeting Targets in Any Area; Culture Change; New Systems; and Moving to the Next Level.

The basic principles of ZYX analysis are versatile. The situations it can be applied to are limited only by imagination and ability to enforce rigorous discipline that ZYX analysis calls for.

ZYX analysis is a three dimensional theory of successful change. Thinking of change in three separate dimensions is the start of the successful framework. Of course, a successful start is only the first stepping stone on a complex journey towards a successful ending. The three dimensions are pictorially represented as the Three Axes: the Z Axis, the Y Axis and the X Axis.

The elements of the Z Axis and Y Axis are somewhat conventional. It is the addition of the X Axis and interactions of the elements therein with the elements of the Z Axis and Y Axis that leads to the magic of success.

The Z Axis is the starting point. The vision drives the strategy and the expected results are best established upfront. The Y Axis is the main execution dimension. For a typical initiative, ZYX methodology dictates it is important that the elements of Readiness, Ambition, Knowledge, Ability and Momentum be initially developed in the order listed. Finally, the elements of the X Axis are the ones that make the difference between a spectacular success and middling results or failure. For a typical initiative, ZYX methodology dictates it is important that the elements of conditioning, fear, trust and inconductivity be initially developed in the order listed.

The Four Essential Pillars of ZYX analysis are:
Thinking in three dimensions.
Interplay between 12 elements of the three Axes.
Customization of the details for each specific situation.
Innovative Analytical Measurements throughout the Change Process.

Analytical Measurements accounted by ZYX analysis are key to maintaining discipline in the Change Initiative. Further, some of the Numerical Indices of ZYX analysis provide early leading indicators to help adjust the course before the problems are even visible using conventional methods.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a flow chart view of the methodology of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF THE PRESENT INVENTION

The embodiment disclosed below is not intended to be exhaustive or limit the invention to the precise form disclosed in the following detailed description. Rather, the embodiment is chosen and described so that others skilled in the art may utilize its teachings.

The detailed descriptions which follow are presented in part in terms of analysis algorithms and symbolic representations of operations. These analysis algorithms may be practiced without the aid or assistance of computers, however in the following description the invention shall be described as being implemented on data bits within a computer memory representing alphanumeric characters or other information. These descriptions and representations are the means used by those skilled in the art of data processing arts to most effectively convey the substance of their work to others skilled in the art.

An algorithm is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, symbols, characters, display data, terms, numbers, or the like. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart a physical organization on the information stored in memory. More than mere abstraction, the data structures are specific electrical or magnetic structural elements in memory which simultaneously represent complex data accurately and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases the distinction between the method operations in operating a computer and the method of computation itself should be recognized. The present invention relates to a method and apparatus for operating a computer in processing electrical or other (e.g., mechanical, chemical) physical signals to generate other desired results.

The present invention also relates to a system for performing these operations. This system may be specifically constructed for the required purposes or it may comprise a general purpose computer as selectively activated or reconfigured by a computer program stored in the computer. The algorithms presented herein are not inherently related to any particular computer or other apparatus. In particular, various general purpose machines may be used with programs written in accordance with the teachings herein, or it may prove more convenient to construct more specialized apparatus to perform the required-method steps. The required structure for a variety of these machines will appear from the description below. The description also uses some terminology relating to change management that need to be clarified in the paragraph below.

Ability—The power of an organization to execute the Change Initiative.

Adaptation Index—A measurement of Ambition. Conditioning, Inductivity and Consistency. People with low Conditioning and low Inductivity tend to be highly intelligent, fast learners and can easily adapt to change. People who show a high degree of consistency tend to detail-oriented and able to form firm convictions. Ambition propels the traits of Conditioning, Inductivity and Consistency into Achievement.

Ambition—The inordinate desire of an organization to make the Change Initiative a success.

Change Agent—A person in an organization who is entrusted with, acts on, and has some power, formal or informal, to formulate and execute change.

Change Agent Manager Index—The measurement of the quality of a manager charged with executing change. This index takes into account elements of all three axes, Consistency Index, self assessment, assessment of other team members and specific abilities as a Change Agent Manager.

Change Audit—A systematic and analytical examination of the Change Initiative, state of change and status of all elements of the Z Axis, Y Axis and X Axis.

Conditioning—A response of an organization to the Change Initiative occasioned by directly unrelated experiences and mostly without immediate analysis.

Consistency Index—The measurement of strength of conviction and attention to detail in the context of the Change Initiative Customized Change Agent Manager Index—A customized version of the Change Agent Manager Index for a specific management position. This index adds specific requirements of a position to the Change Agent Manager Index.

Delta—A measurement of the difference between the Specific View and the General View.

Desired Results—The expected outcomes of the Change Initiative.

Extrapolated X Composite Change Index—An attempted measurement of the status of change based on all elements of the X Axis across the entire population that should have participated in the change audit and had the opportunity to do so.

Extrapolated XY Composite Change Index—An attempted measurement of the status of change based on all elements of the Y Axis and the X Axis across the entire population that should have participated in the Change Audit and should have had the opportunity to do so.

Fear—The anxiety, agitation and apprehension in an organization caused by the Change Initiative.

General View—The measurement of a subject's knowledge of the other team members' views and knowledge.

Inductivity—A characteristic of an organization that allows it to extend itself only in detailed steps that are contiguous to its present state.

Knowledge—The information, understanding, experience and skills in an organization required to succeed at the Change Initiative.

Mistrust—The lack of trust in the Change Initiative and in those leading the change.

Momentum—The impetus of the Change Initiative in an organization.

Overall View—The incorporation of both the Specific View and the general View.

Readiness—The preparation of an organization to implement or continue with the Change Initiative.

Retention Index—This index is designed to identify people who are most likely to contribute highly to the success of the organization.

Specific View—A measurement of what the subjects of a survey think or know themselves, their opinion on a subject.

Strategy—The planning of Change Initiative to achieve the vision (as distinguished from tactics).

Strategy Challenge Index—As the name implies, this index challenges the strategy.

Strategy Index—The index that measures important characteristics of the strategy.

Theory ZYX—The innovative three-dimensional Theory of Successful Change Management.

Trust—The confidence of an organization in the Change Initiative and those leading it relative to the impact on those who are targets of the change.

Vision—The guiding foresight for the Change Initiative.

Vision Challenge Index—As the name implies, this is the index that challenges the Vision.

X Axis—The incorporation of the essential human elements which make the difference between spectacular success and failure.

X Composite Change Index—The measurement of the status of change based on all elements of the X Axis. It includes only the valid participants in the change audit and does not represent the entire population.

X Axis—The execution Axis.

Y Composite Change Index—A measurement of the status of change based on all elements of the Y Axis and the X Axis. It includes only the valid participants in the Change Audit and does not represent the entire population.

Z Axis—The planning Axis.

Z Challenge Index—The index that attempts to measure the quintessential question, "Is the change being pursued the right thing to do?"

Z Composite Change Index—The measurement of the state of change based on all elements of the Z Axis and their interaction with the elements of the Y Axis and the X Axis.

Analytical Measurements accounted by ZYX analysis are key to maintaining discipline in the Change Initiative. Further, some of the Numerical Indices of ZYX analysis provide early leading indicators to help adjust the course before the problems are even visible using conventional methods.

Z Axis—Vision is the starting point. Vision paints a complete picture of the, otherwise abstract, future that lies ahead for an organization. Without the right vision, no strategy or execution can lead to spectacular success. A successful change initiative requires communicating a clear and concise vision.

ZYX analysis endorses traditional concepts related to organizational vision. However, it adds three new requirements.

1. Building the Bridge: Most top executives are deductive thinkers. They start from the desired end results and are easily able to deduce their way to appropriate vision. The hard reality is that most people are not deductive thinkers. For successful Change Management, ZYX analysis calls for systematic building of bridges between deductive thinkers and masses of inductive thinkers. The fact is most organizations lag far behind the deductive thinkers and their visions.

2. Systematic Consideration of Other ZYX analysis Elements: Vision that is not achievable works to the detriment of the organization. The key question is how to ensure that the vision is realistic. The answer lies in systematically analyzing the proposed vision in the context of all other eleven ZYX analysis elements. The analysis may result in revision of vision. It is an iterative process of reviewing and analyzing until vision is in harmony with what can be realistically achieved in the realm of all other eleven elements.

3. Vision Index & Vision Challenge Index: The third new addition advocated by ZYX analysis related to vision is the development of two complimentary indices. These indices ensure that vision of the organization is correct and complete. Vision Index and Vision Challenge Index are leading indicators. They are important measurements in any Change Initiative.

The Vision Index is a weighted index that measures important characteristics of the vision. At the starting point, the Vision Index must be in the Outstanding category i.e., very high. As the execution proceeds, the Vision Index must be measured periodically. Any fall in the Vision Index must be analyzed with the utmost seriousness and corrective action taken if necessary. Should the Vision Index fall to the Fair category, more likely than not, major change in course is necessary.

The Vision Challenge Index, as the name implies, this index is designed to challenge the vision. It answers the quintessential question, is the vision of change being pursued, the right vision? At the starting point, the Vision Challenge Index should be in the Outstanding category i.e., very low. For certain circumstances, the Very Good or Good category may be acceptable. As the execution proceeds, the Vision Challenge Index must be measured periodically, preferably in sync with the Vision Index. Any slip in the Vision Challenge Index must be analyzed followed by corrective action. Should this Index fall to the Fair category, almost always, a major change in course is needed.

Strategy holds different meanings in different organizations, thus leading to difficulty in developing a universal framework for the complex process of Strategy Development. One set of experts has identified ten schools of strategic thought. ZYX analysis is neutral with regard to the school of strategic thought, it simply imposes rigorous discipline of the following five items that the strategy development must conform to:

1. Separate Strategy from Tactics: In the beginning stage, ZYX analysis states it is important to separate strategy from tactics. With the right strategy, a change initiative is likely to succeed even if there are several wrong tactical moves. On the other hand, all the right tactics applied to the wrong strategy lead to failure.

2. Interweave with Other Elements of ZYX analysis: A strategy can be successfully executed only if, in its development process, all eleven other elements of ZYX analysis are interwoven. This is an iterative process of analyzing the strategy as it relates to the other elements of ZYX analysis, revising it and repeating the process until the strategy is in harmony with all the elements of ZYX analysis.

3. Avoid Organizational Behavior Changes: Organizational behavior changes are extremely difficult to accomplish. The strategy should be designed to avoid implementing behavioral changes, if at all possible. Of course, as a last resort, at times there is no other choice but to include organizational behavior change as part of strategy. In such a case, it is extremely important not to underestimate the difficulty of execution.

4. Combine Theory E and Theory O: ZYX analysis states that the strategy must combine Theory E and Theory O in a manner that resolves the inherent tensions between them. The foundation of Theory E is change based on economic value. It is a hard approach involving restructuring, layoffs, and a heavy dose of incentives with short-term economic value creation being the major goal. The foundation of Theory O is change based on organization. It is a soft approach involving building a people-oriented organization, and strong employee commitments with long-term performance being the major goal.

5. Strategy Index and Strategy Challenge Index: These two complimentary analytical measurements help increase the odds that the strategy produced is complete and correct.

ZYX analysis states that the Change Management Program should be focused on results. Countless corporate change initiatives do not succeed because they are fuzzy in nature and focus on managers and their organizations feeling good. Feeling good is only part of the means to an end—the desired results. The vast majority of traits that conventional Change Management methodologies tend to address should be ignored as they do not materially affect the results. ZYX analysis states that the desired results element be developed in all three of the following catagories:

1. Financial Objectives
2. Strategic Objectives
3. ZYX Leading Indicator Objectives Y Axis—The first step in this axis is readiness of the organizations to accept change. The change initiative must clearly communicate to the entire organization not only the needed changes but also the rationale behind them as well as the consequences of resisting the changes. Proposed changes cause anxieties and these anxieties must be addressed to get the organization ready to accept the changes.

ZYX analysis methodology analytically measures the Readiness of the organization and intervenes if needed to make sure that Readiness is at acceptable levels before embarking on the implementation phase. FIG. 1 shows the general flow of the analytical measurement of the organization starting at step 10 where a survey is created including a plurality of questions relating to the subjects of Planning, Execution of the planning, and Persons responsible for the execution of the planning. The survey is given to individuals in the organization, either on paper, electronically, or by in person interview. The responses obtained to the questions from the individuals in the organization are organized and aggregated in step 20, typically by use of a computer system (although hand tabulation and analysis is still possible). Based on this initial raw data, at least one index is calculated relating to at least two of the ZYX elements at step 30. With this data and corresponding calculated index, step 40 involves the management in interpreting the results to implement the plan which has the greatest likelihood of success.

The second step is the ambition among the people to make change happen. ZYX analysis calls for analytically measuring Collective Ambition Levels of groups and subgroups. In case the Collective Ambition levels are acceptable, the following step can be omitted. If the Collective Ambition Levels are lower than where they need to be, ZYX analysis calls for dividing the organization into four groups.

$1^{st}$ Group: People willing to change on their own based on senior management's efforts to get the organization read for change.

$2^{nd}$ Group: People who are likely to change given reasonable encouragement, training and incentives.

$3^{rd}$ Group: People who are active against change either visibly or behind the scene.

$4^{th}$ Group: People who give lip service to change, but in reality, are passive bystanders and have no sincere intention of abandoning old ways.

ZYX analysis calls for separate strategies for each of the aforementioned groups.

After Readiness and Ambition to change comes the need for Knowledge to change. Knowledge is the element that is most often ignored leading to failure of the entire change initiative. ZYX analysis calls for education, training and tools for every area of change. This is a critical element in which all the elements of the X Axis should be incorporated to be successful.

Applying the Knowledge element to actually execute change takes time, follow-up and reinforcement. Success in this element depends to a large degree on how effectively the Knowledge element is integrated with the elements of the X Axis. To rapidly facilitate the ability to actually change, elements of the X Axis must be integrated with supervision, mentoring, performance measurement, change audits and new tools.

Once the ball is rolling, it is important to build on the momentum of change. Celebrating successes, financial rewards, recognition, constant communication, ongoing training, change audits, managers acting as role models, and terminations when objectives are not met are all a part of a cohesive Change Management Plan to maintain momentum.

X Axis—First step in this axis is to measure condition relative to the objective. This is typically the missing dimension in most Change Management Programs. Organizations are made of individuals. There cannot be sustainable change in groups without sustainable changes in the individuals that comprise them. Individual change is intensely personal and remarkably hard to achieve.

Conditioning is defined as a process of behavior by which a subject comes to associate a desired behavior with a previously unrelated stimulus. When the potential response of a subject is conflicted because it is associated with two separate but competing past stimuli, it is called competing conditioning.

Most individuals are highly conditioned. Intense conditioning begins at birth. By the time an individual is in a responsible position in an organization, there is no getting around conditioned behavior without conscious effort. The problem is that most individuals do not even know that most of their behavior is a product of their conditioning. To change the behavior, an individual must understand the intellectual basis of his behavior, have the desire to change and have the knowledge to overcome the conditioning.

Groups that have been together for a long time are also highly conditioned. In addition, they typically function based on "tribal knowledge" and mutual support. These groups tend to behave like one living organism. When an organism is pricked at one point, the entire body reacts. Similarly, even if the Change Initiative affects a small part of the group, the entire group reacts. To change, groups must first understand their underlying conditioning.

A common management mistake is to think that new groups formed as a result of mergers or restructuring are not highly conditioned. Typically even after restructuring, strong pockets of people with same group conditioning remain. The situation may become worse because of competing strong pockets of conditioning in the same group.

It is easier to identify competing conditioning in groups than in individuals. One of the most frustrating experiences for the senior management is to find talented employees who want to change but are unable to perform in a new fashion. Such employees may suffer from competing conditioning.

The employees may be ambitious and conditioned to changing to help fulfill their roles in the organization, but some elements of the change may conflict with their long-held beliefs. On their own, most people are unlikely to uncover and resolve competing conditioning.

ZYX analysis emphasizes training for identifying overall conditioning as well as competing conditionings both for groups and individuals. After identification, training for deconditioning is equally important. Such training must be customized and focused only on those issues that are at the core of the change initiative. Further, the training must be integrated with other elements of all three of the Axes.

A successful Change Movement Program must focus on two kinds of fear both at the group level and at the individual level. External fear arises from factors perceived as external to the group or the individual and is easily understood. It is the fear of elimination of a group, outsourcing, termination, being passed over for a promotion, not getting along with new bosses, not keeping up with technology, etc.

Internal fear arises from factors internal to the group or the individual and is not commonly integrated in a Change Management Program. Consider the case of an executive who has just been given new responsibilities that he always wanted as a part of the change initiative. Secretly or subconsciously the executive fears the new assignment because he does not feel fully prepared to meet the challenge of the new assignment.

Without some fear it is very difficult to move the organization out of its comfort zone. On the other hand, too much fear causes paralysis and rapidly diminishes the probability of success. Diagram 6 illustrates the Ideal Fear Zone for Change Effectiveness.

Unless the followers and external stakeholders trust their leaders, successful change is very difficult if not impossible to implement. Leaders must gain the trust one person at a time—that is why it is such a tedious process. Predictability, values, repeated clear articulation at a detailed level and walking the talk are the four key ingredients of this element that must be integrated with other elements of all the three Axes.

Most Senior Managers do a good job of communicating their vision; where they fail is in understanding that most, not all, of their employees are inductive thinkers. The same is true for most employees in the external constituencies to the organization. Inductive thinkers can only reliably proceed to areas contiguous to where they are presently. The employees may understand the vision and may genuinely want to get there, but in the absence of a Change Management Program starting from the vision, working backward to systematically break down the big picture into progressively smaller tasks until the details are within the comfort realm of inductive thinkers and integrating details with other elements of ZYX analysis, the excellent results are not likely to be achieved.

Senior Mangers are well served by recruiting their employees with low inductivity as Change Agents. The rank and file Change Agents are much more effective in making the specific details understood and being credible to a wide audience.

Managing talent successfully is essential to the success of every enterprise. The ZYX analysis methodology for talent management centers on a unique Talent Index. The Talent Index is integral to the implementation of ZYX analysis. The Talent Index is designed to measure raw inherent talent in an individual as it applies directly to the objectives of an initiative. The Talent Index in its purest form is agnostic to education, training, or expertise.

An Enhanced Customized Talent Index is based on the Talent Index and takes into account education, training, expertise as well as other success skills as appropriate for a Change Initiative. Often it makes sense to utilize an organization's existing Performance Review System to build the Enhanced Customized Talent Index.

The Talent Index and Enhanced Customized Talent Index are ideal tools to: Select the right talent; Retain the right talent; Promote the right talent; Further develop the right talent; and Downsize without losing needed talent.

Analytical Measurements are the cornerstone of ZYX analysis. They give early warnings long before such warnings become evident in normal business statistics. They help rapid and correct course adjustments in the organization. They impose strict organizational discipline. They provide insights otherwise not available. They make the change process more objective, and finally the help the organization stay true to its values as it changes.

Change is a dynamic process. The quintessential Analytical Measurements must also be dynamic. First, measurements are taken by surveys of individuals in the organization with questions relating to the various ZYX analysis elements or subjects, both factual and opinion based information. Next, the data from the survey is collected, aggregated, and analyzed to provide guidance for management of the change situation. Following is an explanation of the process and a listing of some of the wide ranging indexes which are calculated from the data from the survey questions. After that, actual examples of the ZYX analysis are given.

A survey is created with questions designed to elicit certain information from each member of the group with regard to the twelve elements or subjects of ZYX analysis. These questions are in the form of a statement that the examinee must respond to by giving a level of agreement. The examinee is asked to give his level of agreement (the specific response) and the level of agreement he feels that others in his group have with the statement (the general response). A few of these questions are duplicated and slightly rewritten. These questions are then given in random order in the form of a survey to the people that will take part in the audit. Responses to questions can range from 0 (zero) to 5 (five). A response of 0 (zero) is equivalent to "Do Not Know". A response ranging from 1 (one) to 5 (five) ranges from disagreement to agreement. In some cases, specifically the Customized Change Agent Manager Index, the audit is performed in two stages. The first being a written survey and the second being an interview conducted in similar fashion by a trained interviewer.

Specific element scores are created by taking the weighted average specific response to questions assigned to a particular element or subject from the survey. This average response is then normalized to a scale from 0 (zero) to 100 (one-hundred) by multiplying the result by 20 (twenty).

Specific Indices measured are: Specific Vision; Specific Strategy; Specific Desired Results; Specific Readiness; Specific Ambition; Specific Knowledge; Specific Momentum; Specific Ability; Specific Fear; Specific Trust; Specific Inductivity; and Specific Conditioning. General element scores are created by taking the weighted average general response to questions assigned to a particular element from the survey. This average response is then normalized to a scale from 0 (zero) to 100 (one-hundred) by multiplying the result by 20 (twenty).

General Indices measured are: General Vision; General Strategy; General Desired Results; General Readiness; General Ambition; General Knowledge; General Momentum; General Ability; General Fear; General Trust; General Inductivity; and General Conditioning. Element scores are created by taking the weighted average response to questions assigned to a particular element from the survey. In the case of overall element scores, both the specific and general responses are considered. This average response is then normalized to a scale from 0 (zero) to 100 (one-hundred) by multiplying the result by 20 (twenty).

Overall Indices measured are: Overall Vision; Overall Strategy; Overall Desired Results; Overall Readiness; Overall Ambition; Overall Knowledge; Overall Momentum; Overall Ability; Overall Fear; Overall Trust; Overall Inductivity; and Overall Conditioning.

The Specific Z Composite Index is created by taking the weighted average of the Specific Element Scores of elements that belong to the Z Axis. The General Z Composite Index is created by taking the weighted average of the General Element Scores of elements that belong to the Z Axis. The Overall Z Composite Index is created by taking the weighted average of the Overall Element Scores of elements that belong to the Z Axis. The Z Composite Index Delta is computed by taking the Specific Z Composite Index and subtracting the General Z Composite Index.

The Specific X Composite Index is created by taking the weighted average of the Specific Element Scores of elements that belong to the X Axis. The General X Composite Index is created by taking the weighted average of the General Element Scores of elements that belong to the X Axis. The Overall X Composite Index is created by taking the weighted average of the Overall Element Scores of elements that belong to the X Axis. The X Composite Index Delta is computed by taking the Specific X Composite Index and subtracting the General X Composite Index.

The Specific Y Composite Index is created by taking the weighted average of the Specific Element Scores of elements that belong to the Y Axis. The General Y Composite Index is created by taking the weighted average of the General Element Scores of elements that belong to the Y Axis. The Overall Y Composite Index is created by taking the weighted average of the Overall Element Scores of elements that belong to the Y Axis. The Y Composite Index Delta is computed by taking the Specific Y Composite Index and subtracting the General Y Composite Index.

The Specific YX Composite Index is computed by taking the Specific Y Composite Index and Subtracting the Specific X Composite Index. The General YX Composite Index is computed by taking the General Y Composite Index and Subtracting the General X Composite Index. The Overall YX Composite Index is computed by taking the Overall Y Composite Index and Subtracting the Overall X Composite Index. The YX Composite Index Delta is computed by taking the Specific YX Composite Index and subtracting the General YX Composite Index.

The Specific Z Composite Challenge Index is created by taking the weighted average of the Specific Element Scores of elements that belong to the Z Axis challenge elements. The General Z Composite Challenge Index is created by taking the weighted average of the General Element Scores of elements that belong to the Z Axis challenge elements. The Overall Z Composite Challenge Index is created by taking the weighted average of the Overall Element Scores of elements that belong to the Z Axis challenge elements. The Z Composite Challenge Index Delta is computed by taking the Specific Z Composite Challenge Index and subtracting the General Z Composite Challenge Index.

The Specific Vision Challenge Index is created by taking the weighted average of the Specific Element Scores of elements that belong to the Vision Challenge group. The General Vision Challenge Index is created by taking the weighted average of the General Element Scores of elements that belong to the Vision Challenge group. The Overall Vision Challenge Index is created by taking the weighted average of the Overall Element Scores of elements that belong to the Vision Challenge group. The Vision Challenge Index Delta is computed by taking the Specific Vision Challenge Index and subtracting the General Vision Challenge Index.

The Specific Strategy Challenge Index is created by taking the weighted average of the Specific Element Scores of elements that belong to the Strategy Challenge group. The General Strategy Challenge Index is created by taking the weighted average of the General Element Scores of elements that belong to the Strategy Challenge group. The Overall Strategy Challenge Index is created by taking the weighted average of the Overall Element Scores of elements that belong to the Strategy Challenge group. The Strategy Challenge Index Delta is computed by taking the Specific Strategy Challenge Index and subtracting the General Strategy Challenge Index.

The Specific Desired Results Challenge Index is created by taking the weighted average of the Specific Element Scores of elements that belong to the Desired Results Challenge group. The General Desired Results Challenge Index is created by taking the weighted average of the General Element Scores of elements that belong to the Desired Results Challenge group. The Overall Desired Results Challenge Index is created by taking the weighted average of the Overall Element Scores of elements that belong to the Desired Results Challenge group. The Desired Results Challenge Index Delta is computed by taking the Specific Desired Results Challenge Index and subtracting the General Desired Results Challenge Index.

The Specific Vision Index is created by taking the weighted average of the Specific Element Scores of elements that belong to the Vision group. The General Vision Index is created by taking the weighted average of the General Element Scores of elements that belong to the Vision group. The Overall Vision Index is created by taking the weighted average of the Overall Element Scores of elements that belong to the Vision group. The Vision Index Delta is computed by taking the Specific Vision Index and subtracting the General Vision Index.

The Specific Strategy Index is created by taking the weighted average of the Specific Element Scores of elements that belong to the Strategy group. The General Strategy Index is created by taking the weighted average of the General Element Scores of elements that belong to the Strategy group. The Overall Strategy Index is created by taking the weighted average of the Overall Element Scores of elements that belong to the Strategy group. The Strategy Index Delta is computed by taking the Specific Strategy Index and subtracting the General Strategy Index.

The Specific Desired Results Index is created by taking the weighted average of the Specific Element Scores of elements that belong to the Desired Results group. The General Desired Results Index is created by taking the weighted average of the General Element Scores of elements that belong to the Desired Results group. The Overall Desired Results Index is created by taking the weighted average of the Overall Element Scores of elements that belong to the Desired Results group. The Desired Results Index Delta is computed by taking the Specific Desired Results Index and subtracting the General Desired Results Index.

The Conviction Index, computed on an individual basis has several uses. One use is to filter "noise" from the audit. "Noise" is defined as people who are not answering truthfully, not paying attention, randomly answering questions, or purposefully attempting to invalidate the audit. The Conviction Index is computed by determining the percentage of duplicate questions that were answered within 2 (two) points of its duplicate. The Conviction Index is used in grouping examinees.

The Retention Index is computed on an individual basis as well. The examinee's Specific Conditioning Score plus his Specific Inductivity Score are summed and then subtracted from 240 (two-hundred forty). To this result are added the examinee's Specific Ambition Score and half of the examinee's Conviction Index. This result is then normalized by dividing by 3.5 (three and a half). The Retention Index is used in grouping examinees.

The Specific Change Agent Index is created by taking the weighted average of the Specific Element Scores of elements that belong to the Change Agent group. The General Change Agent Index is created by taking the weighted average of the General Element Scores of elements that belong to the Change Agent group. The Overall Change Agent Index is created by taking the weighted average of the Overall Element Scores of elements that belong to the Change Agent group. The Change Agent Index Delta is computed by taking the Specific Change Agent Index and subtracting the General Change Agent Index.

The Customized Change Agent Manager Index can only be computed for examinees that make it into Group 1 or Group 2 as described below. The Index is computed by taking the sum of double the result of 120 (one-hundred twenty) minus the Specific X Composite Index, the Specific Y Composite Index, half of the Specific Change Agent Index, half of the Conviction Index, the General Change Agent Index. To this result are added the scores given by a trained interviewer in the amount of 3 (three) times the Specific Change Agent Interview Score and 2 (two) times the General Change Agent Interview Score. The final result is achieved by normalizing the score by dividing by 10 (ten).

Examinees are divided into four groups as follows. Group 1 consists of the those examinees that scored 50 (fifty) or more on both their Conviction Index and Retention Index. Group 2 consists of those that may have scored less on their Conviction Index but still maintained a score greater than 50 (fifty) on their Retention Index. Group 4 is composed of those examinees that chose not to begin or complete Their audit. The remaining examinees are placed in Group 3.

Following the calculation of the various indices, they may be interpreted according to the following guidelines:

Interpretation Guidelines

| YX Composite Change Index | |
|---|---|
| Greater than 40 | Outstanding |
| 21 to 40 | Very Good |
| 0 to 20 | Good |
| −20 to −1 | Fair |
| −40 to −21 | Poor |
| Less than −40 | Serious Trouble |

| Y Axis Composites or Elements | |
|---|---|
| Greater than 80 | Outstanding |
| 71 to 80 | Very Good |
| 61 to 70 | Good |
| 51 to 60 | Fair |
| 41 to 50 | Poor |
| Less than 40 | Serious Trouble |

| X Axis Composites or Elements | |
|---|---|
| Less than 40 | Outstanding |
| 41 to 50 | Very Good |
| 51 to 60 | Good |
| 61 to 70 | Fair |
| 71 to 80 | Poor |
| Greater than 80 | Serious Trouble |

| Change Agent Manager Index | |
|---|---|
| Greater than 85 | Outstanding |
| 81 to 85 | Very Good |
| 75 to 80 | Good |
| 61 to 74 | Fair |

-continued

Change Agent Manager Index

| | |
|---|---|
| 51 to 60 | Poor |
| Less than 51 | Serious Trouble |

Z Axis Composite Challenge or Elements

| | |
|---|---|
| Less than 25 | Outstanding |
| 25 to 35 | Very Good |
| 35 to 45 | Good |
| 45 to 55 | Fair |
| 55 to 65 | Poor |
| Greater than 65 | Serious Trouble |

YX Composite Delta

| | |
|---|---|
| Greater than 40 | Unsatisfactory |
| 21 to 40 | Fair |
| 0 to 20 | Good |
| Less than 0 | Unsatisfactory |

Y Delta: Specific View - General View

| | |
|---|---|
| Greater than 20 | Unsatisfactory |
| 11 to 20 | Fair |
| 0 to 10 | Good |
| Less than 0 | Unsatisfactory |

X Delta: Specific View - General View

| | |
|---|---|
| Less than −20 | Unsatisfactory |
| −11 to −20 | Fair |
| 0 to −10 | Good |
| Greater than 0 | Unsatisfactory |

Z Axis Composites or Elements

| | |
|---|---|
| Greater than 65 | Outstanding |
| 55 to 65 | Very Good |
| 45 to 55 | Good |
| 35 to 45 | Fair |
| 25 to 35 | Poor |
| Less than 25 | Terrible |

Adaptation Index

| | |
|---|---|
| Group 1 | Respondents from this group are most likely to be successful in adapting to change. |
| Group 2 | Respondents from this group may have essential functional skills, technical skills or business needs, but this group will have difficulty with the change. |
| Group 3 | Not consistent in interviews and/or surveys or did not complete the process. High probability that these are actively against change either visibly or behind the scenes. |
| Group 4 | Extremely inconsistent or did not participate at all. High probability that these people are passive bystanders and have no sincere intention of abandoning old ways. |

The best way to illustrate the power of ZYX analysis Analytical Measurements is through example. Several examples follow, first a specific, detailed enterprise level analysis, followed by several examples showing other more specific uses of ZYX analysis:

In this general example, first senior managers of the exemplary organization developed a vision. The Vision and Vision Challenge Indices were developed. Vision Index scored in the Fair Category. Vision Challenge Index scored in the Poor Category.

Senior managers were asked to take into account the requirements of ZYX analysis and the Vision and Vision challenges indices were recompiled. Both Indices scored in the Very Good Category and the senior managers began to focus on Strategy.

In creating the Vision Index, the following statements were used with the following weights:

| | Statement | Weight |
|---|---|---|
| 1. | The Vision inspires the stakeholders. | 20 |
| 2. | The Vision aligns the organization. | 5 |
| 3. | The Vision directs the strategy of the organization. | 10 |
| 4. | The Vision directs the execution of the organization. | 5 |
| 5. | The Vision is easily communicated to others. | 5 |
| 6. | The Vision anchors values. | 2 |
| 7. | The Vision is stretching but achievable. | 2 |
| 8. | The Vision creates 'wins' for all the stakeholders. | 5 |
| 9. | The Vision is specific to this situation. | 10 |
| 10. | The purpose of the Vision is to move the organization toward the creation of a more satisfying product or service. | 10 |
| 11. | The Vision takes into account the impact of all elements of the Y Axis (Knowledge, Ambition, Readiness, Momentum, Ability). | 10 |
| 12. | The Company's Vision takes into account the impact of all elements of the X Axis (Fear, Mistrust, Inductivity, Conditioning). | 10 |
| 13. | The Vision is dynamically incomplete, meaning that people can fill in the blanks as it applies to them. | 2 |
| 14. | The Vision paints a picture of the future. | 2 |
| 15. | The Vision catches attention. | 2 |

Next the Vision Challenge Index was created using the following statements with the following weights:

| Statement | Weight |
|---|---|
| The Vision describes few short-term victories or milestones. | 5 |
| There is a large gap between where people are and where they are supposed to go. | 5 |
| Our Vision ignores the X Axis elements (Fear, Mistrust, Inductivity, Conditioning). | 10 |

-continued

| Statement | Weight |
|---|---|
| The Vision ignores the impact of the Y Axis elements (Knowledge, Ambition, Readiness, Momentum, Ability). | 10 |
| There does not seem to be a continual improvement in the organization | 5 |
| There seems to be quite a few changes in the external conditions relating to our organization's culture or business. | 40 |
| The Vision does not answer the quintessential question, 'What's in it for me?' | 10 |
| The Vision is too internally focused. | 5 |
| The Vision seems to dishonor the past. | 5 |
| We have no good means of determining the effect of the Vision in the short-term (i.e. no early indicators). | 5 |

Further, for both indices the following weights were used:

| Group | Weight |
|---|---|
| CEO | 40% |
| CEO Direct Reports | 30% |
| Customers | 20% |
| External Advisors | 10% |

The Strategy Index and Strategy Challenge Index were developed. Strategy Index scored in the Fair Category. Strategy Challenge Index scored in the Poor Category. These results forced the management team to go back to the drawing board and revamp the strategy.

Management lengthened the period in which results were to be obtained. Based on higher than expected inductivity of certain groups, management also changed the distribution strategy. Proposed new information technology systems were abandoned in favor of emphasis on better utilization of existing systems. Based on high levels of conditioning in one key group, it was decided to bring in new blood from outside to fill all the key positions in this group. New product introduction strategy was also drastically changed.

Strategy Index and Strategy Challenge Index were recompiled in the revamped strategy. Both Indices scored in the Very Good Category, thus giving a green signal to proceed.

In preparing the Strategy Index, the following statements were used with the following weights:

| Statement | Weight |
|---|---|
| 1. Tactics have been separated from strategy. | 10 |
| 2. Strategy does not call for organization behavior change. | 30 |
| 3. Strategy combines Theory E and Theory O. | 5 |
| 4. Strategy can realistically produce all the desired results. | 20 |
| 5. Conditioning of the people affected by strategy is such that they will be receptive. | 10 |
| 6. Changes required to implement the strategy are such that the fear level among the employees can be managed in the right zone. | 5 |
| 7. Inductivity of employees is such that they can easily adapt to the changes. | 5 |
| 8. There is enough trust between various groups to implement the strategy. | 5 |
| 9. It is realistic to assume that the company, customers, and suppliers can become ready to accept the new strategy in a timely manner. | 5 |
| 10. There is enough Ambition, Knowledge and Ability within the company to carry out the Strategy successfully. | 5 |

The Strategy Challenge Index was used with the following weights:

| Statement | Weight |
|---|---|
| 1. All realistic responses from competitors have not been taken into account. | 20 |
| 2. The Conditioning, Inductivity, Fear, and Trust of customers have not been taken into account. | 60 |
| 3. All realistic responses from the distribution channel have not been taken into account. | 10 |
| 4. All key groups within the company will not be able to successfully implement the new Strategy. | 20 |
| 5. Required processes and systems will not be fully operational and people comfortable with them in time to achieve the Desired Results in a timely manner. | 30 |

Further, for both indices the following weights were used:

| Group | Weight |
|---|---|
| CEO | 20% |
| CEO Direct Reports | 20% |
| Other Key Employees | 10% |
| Customers | 10% |
| Distribution Channel | 10% |
| Suppliers | 5% |
| External Advisors | 15% |

Revamping of the Strategy, including lengthening the time in which Desired Results were to be achieved, helped both Results Index and Results Challenge Index score in the Very Good category.

In creating the Results Index, the following statements were used with the following weights:

| Statement | Weight |
|---|---|
| 1. Financial Results are realistically achievable. | 30 |
| 2. Strategic Results are realistically achievable. | 40 |
| 3. Leading Indicators have been developed and solid Measurement Systems will be in place in time. | 30 |

In creating the Results Challenge Index, the following statements were used with the following weights:

| Statement | Weight |
|---|---|
| 1. Leading Indicators will not truly predict the results. | 30 |
| 2. Management is not good enough to react to the Leading Indicators. | 30 |
| 3. Strategic Objectives and Financial Objectives are ot in sync. | 40 |

Further, for both indices, the following weights were used.

| Group | Weight |
|---|---|
| CEO | 20% |
| CEO Direct Reports | 20% |

| Group | Weight |
|---|---|
| Other Key Employees | 40% |
| External Advisors | 20% |

Z Composite and Z Challenge Composite

These indices scored in the Very Good Category. The following weights were used to compile these indices:

| Group | Weight |
|---|---|
| Vision and Vision Challenge Indices | 50% |
| Strategy and Strategy Challenge Indices | 30% |
| Results and Results Challenge Indices | 20% |

The YX composite is measured after development of the Vision and the Strategy, a Change Audit was conducted and the X Composite Index and the Y Composite Index were compiled. The X Composite Index scored in the Poor Category. The Y Composite Index scored in the Good Category.

Senior managers took action to address issues of Mistrust and Fear revealed by the X Composite Index. A new training program was implemented to increase the Readiness and Knowledge elements of the Y Axis. A subsequent Change Audit showed an X Composite Index in the Good Category and a Y Composite Index in the Very Good Category.

The Y Composite Index was created using the following statements to compute data points for the following elements:

| Statement | Element |
|---|---|
| 1. Clear understanding of Senior Management's vision of the future. | Readiness |
| 2. Clear understanding of the strategy to make the vision of the future a reality. | Readiness |
| 3. Clear understanding of the results each person is expected to produce. | Readiness |
| 4. Clear understanding of the benefits of change. | Readiness |
| 5. Clear understanding of what will happen if change is not made. | Readiness |
| 6. Reception of a person's ideas by colleagues. | Ambition |
| 7. Reception of a person's ideas by managers. | Ambition |
| 8. Employees do not leave their jobs only because they like where the organization is heading. | Ambition |
| 9. There is not substantial resistance to the change that is going on. | Ambition |
| 10. Change is not likely to be impossible. | Ambition |
| 11. It is good that management's main concern is to make money for the business. | Knowledge |
| 12. Clear knowledge of how the change will impact an employee's compensation and workload. | Knowledge |
| 13. People recognize and know how to execute the personal change required to meet the goals. | Knowledge |
| 14. The way change is being made makes sense to those doing the work. | Knowledge |
| 15. More interaction with Senior Management will be helpful in making change become a reality. | Knowledge |
| 16. Extent of the resources available to make change succeed. | Ability |
| 17. People are fully engaged in making change happen. | Ability |
| 18. People are willing to apply themselves to get the work done. | Ability |
| 19. The intensity of work has been increasing. | Ability |
| 20. Management does expect employees to give more than the minimal performance. | Ability |
| 21. Much of change is going well, on schedule and under budget. | Momentum |
| 22. People have taken on real responsibility to make change happen. | Momentum |
| 23. People are increasingly being recognized and rewarded for executing change. | Momentum |
| 24. Different sets of visions and strategies for now will not be better. | Momentum |
| 25. Employees are increasingly able to do their own jobs. | Momentum |
| 26. Workers agree with the approach to reaching the goals. | Knowledge |
| 27. People are working a lot harder. | Ability |
| 28. People are self-motivated to achieve the results. | Momentum |

In creating the X Composite Index, The following statements were used to compute data points for the following elements:

| Statement | Element |
|---|---|
| 1. Difficulty of driving in a country where the rule is to drive to the left. | Conditioning |
| 2. Change is a negative reflection on the performances of the past. | Conditioning |
| 3. People are going to get burned by this change initiative like other changes we have implemented. | Conditioning |
| 4. It would have been better to keep things the way they were. | Conditioning |
| 5. Internal obstacles cannot be overcome quickly. | Conditioning |
| 6. People fear they will not be able to do things as well the new way. | Fear |
| 7. If the change fails, there will not be much impact. | Fear |
| 8. People feel that helping change happen quickly means quick elimination of their jobs. | Fear |
| 9. Change is making peoples' skills obsolete and there is not enough opportunity for growth. | Fear |
| 10. People fear that they will not succeed. | Fear |
| 11. People do not trust their main leader. | Trust |
| 12. People trust the main leader but do not trust other managers. | Trust |
| 13. When things go wrong, the main concern is to lay blame. | Trust |
| 14. Managers, supervisors and leaders are not good at their jobs. | Trust |
| 15. People are hesitant to come forward with their ideas or convey the true status. | Trust |
| 16. All the steps between where we are and where management wants us to be are not clear. | Inductivity |
| 17. People do not have skills and tools to adapt to change. | Inductivity |
| 18. Management shares the end goal, the next few steps and nothing else. | Inductivity |
| 19. The new initiatives are mentally too demanding and affect life outside work. | Inductivity |
| 20. Management does not know enough details of our work. | Inductivity |
| 21. Change is not making things better. | Conditioning |
| 22. When things do not go right, fixing things is not the first priority. | Trust |

Further Change Agent and Change Agent Manager Indices were compiled based on ZYX analysis Talent Management Methodology. Change Agents and Change Agent Managers were placed in key slots. ZYX analysis implementation framework was rigorously followed. The final result was huge success.

Must Change the Course

Consider the example of an organization where a Change Audit at interval 'n' reveals that the Z Composite Index and Z Challenge Index are in the Outstanding Category. The YX Composite Index (overall) turns out to be in the Good Category. The Interpretation is that this organization has extremely high probability of success.

A Mini Change Audit at internal 'n+3 months' shows that both Z Composite Index and Z Challenge Index have slipped a notch to the Very Good Category. Further analysis reveals that the slip is due to market conditions changing in the preceding three months. Meanwhile management's focus on execution and human elements involved is beginning to pay off as is evident from YX Composite Index moving up to the Very Good Category. The Interpretation is that management needs to stay on course but be extra vigilant about the nature of changing market conditions.

A Mini Change Audit at 'n+6 months' shows Z Challenge Index moving to the Fair Category. Further Analysis shows a continued shift in market conditions. Execution improves to become Outstanding. Alas, the course must be changed. Outstanding execution on the path that market forces are increasingly challenging will not lead to success.

Must Replace the Managers

Consider the example where senior executives have charged managers of a division to execute change. The managers collectively exhibit levels of Conditioning and Inductivity that fall in the Poor Category. Fear and Mistrust fail in the Fair Category.

Forced by lack of progress, Senior Executives intervene. The executives are progressive and able to recognize that the level of Fear and Mistrust are too high. They guarantee the Managers' job security, communicate effectively about the plan and start talking to the Managers about their intentions regarding the division. A subsequent Mini Change Audit shows that Fear and Mistrust have improved to the Good Category.

The reality is that the Change Initiative is still doomed for failure as Conditioning and Inductivity levels of the managers as a group are so high that they are not capable of even changing themselves. How can they be expected to change the entire division? The solution in this example is transitioning managers out of their present roles and bringing new blood into management.

The Cardinal Sin

The cardinal sin of Change Management is an attempt to execute change by providing functional, technical systems knowledge without adequately preparing the organization for change and not developing the ability as well as momentum to generate desire results.

Consider the example of an organization that invests heavily in new computer systems and tools with the expectation of significant and immediate payback. The organization successfully completes the implementation of the new systems. Users are thoroughly trained on the intricacies of the new systems and tools.

Payback does not come close to expectations. Management is puzzled and decides to conduct a Change Audit. The Audit shows that training has successfully produced Knowledge in the Good Category. But with poor Readiness, seriously low organizational Ambition and poor Momentum, results cannot be expected.

At this stage, it behooves the management to pay attention, conduct a Change Audit specifically directed at the element of the X Axis. It is likely that the X Axis elements are responsible for the current state of the Y Axis elements.

After a deep understanding of the status of the X Axis elements, management needs to come up with a plan that increases Readiness of the organization and significantly improves organizational Ambition. At that stage some retraining to refresh Knowledge followed by measures to enhance Ability and build Momentum is called for.

Merger: Management Team Not Cohesive

Consider the example of Organization A and Organization B merging in what is billed as a merger of equals. Prior to the merger, both organizations were doing well. They crafted a great vision of the merged organization. To satisfy all stakeholders, the CEO of organization A was named CEO of the merged organization, but the vast majority of the CEO's direct reports came form organization B.

Based on ZYX analysis, various indices were constructed. As expected, Vision Challenge Index placed in the Outstanding category. On the other hand, Strategy Challenge Index placed in the Serious Trouble category. The cultural differences in the two organizations were too deep and the strategy did not effectively address the issue. Management team dismissed the warning from the Strategy Challenge Index, primarily because they did not understand the interpretation.

The CEO of organization A and now the CEO of the merged company, focused his time on strategy, teams and promoting a culture that truly empowered the managers. He rarely got involved in the making of most decisions; he simply held managers accountable for the results.

The CEO of organization B was very detail-oriented. His managers took pride in putting together detailed analysis reports for review by the CEO. In the end, the CEO made most of the important decisions.

In the merged organization, the CEO expected to operate like he did with organization A. His direct reports expected to operate the way they always worked—preparing detailed analysis reports, but only rarely making decisions themselves. Now these managers had a CEO who did not want to look at their reports, the managers felt that the CEO did not respect their talents of gathering information and analysis leading to their frustration with their new boss.

In the meanwhile, the CEO expected the managers to make the decisions that the managers were not used to. To make matters worse, employees who came from organization A felt stifled because they were no longer empowered to act under new bosses. Bosses who came from organization B formed a very low opinion of their employees who came from organization A, because they were not good at preparing their reports.

Inertia carried the organization for awhile; cost cutting financial numbers look good. One year after the merger, the organization was not able to meet its financial goals. The serious shortfall in financial results finally forced the management to come to grips with the real cause. An outstanding vision did not help the organization as it could not execute. A valuable year was lost, competition was gaining.

A Change Audit 13 months after closing of the merger showed the YX Composite Index at the Serious Trouble level. The irony of the situation was that the YX Composite Index only three months after the merger closing had highlighted Serious Trouble, thereby giving an early warning of the impending disaster.

ZYX Analysis: Putting It to Work

Three stonecutters were doing identical jobs. But their perceptions of what they were doing were starkly different. One was making a living, the second was cutting stone, and the third was building a cathedral.

The most important point in putting ZYX analysis to work is getting a complete handle on not only the realities but also the perceptions in the environment that the organization operates in.

Internal as well as external perceptions must be addressed. Internal perceptions are those of the people in various layers of the organization. External perceptions include those of customers, suppliers, banks, stockholders, Wall Street and regulators.

The Stage of Change

One end of the spectrum is a CEO contemplating major change to the other end where a change program has been implemented without satisfactory results. Or it simply may be the case that the organization believes the words of Will Rogers: "Even if you are on the right track, you will get run over if you just sit there."

Will Rogers

And the goal is to accelerate or enhance the change. Whatever the stage may be, a vision in the CEO's head, a contemplated merger, rapid loss of customers, exponential growth or new technology, ZYX analysis framework can be customized to achieve the big success.

No two Change Initiatives are exactly alike. There does not have to be a valley in the organizational morale, but the fact is most Initiatives do exhibit a valley. Obviously, the diagram is a high level simplification of real life, but it does clearly illustrate the point—setbacks and dips in morale are to be expected. The key to keeping the valley short and shallow is to rigorously follow ZYX analysis, especially in taking Analytical Measurements at short intervals and proactively making rapid adjustments to the course.

The Change Audit

Organizations do financial audits. The do safety audits. They take physical inventory. But they rarely ever think of a change audit. ZYX analysis framework offers a new innovative tool: A structured Change Audit. A Change Audit utilizes the quintessential Analytical Measurements of ZYX analysis. The first Change Audit sets up a baseline on all pertinent aspects that need to change including all elements of the Z Axis, the Y Axis and the X Axis. The audit can include both internal and external constituencies.

Subsequent audits can be Mini Audits with specific narrow focus. It is best to preplan the audits as an integral part of the change framework. Typical internal constituency includes employees. Typical external constituencies include customers, suppliers, stockholders, Wall Street, banks and regulators. The baseline not only helps in better formulations of plans and better implementation but also allows further measurements that act as early indicators long before the results show up in normal business statistics. As an early predictor of future business results, the value of a Change Audit is immense.

The Change Agents

The CEO or the General Manger obviously has to be the Lead Change Agent. A successful Lead Change Agent leads an informal network of Change Agents in several layers of the organization in a manner that transcends the published organization chart. A Change Audit can identify the individuals in the organization who can become effective change agents but may not have been noticed for that role by the senior management.

The nature of the organization and scope of the Change Initiative determine the number of Change Agents needed in each of the various different Change Agent roles. The common mistake is for the senior management to underestimate the number of Change Agents needed.

When considering the Z Axis plan, i.e. vision, strategy and the desired results, the availability of enough Change Agents should be considered. Good Change Agents are leaders. Leaders should not be confused with managers. Both have their separate place and role in an organization. Sometimes a good manager is also a good leader, other times a good leader is also a good manager. But to assume that a leader and a manager are synonymous is a mistake.

The Change Management Training

Good Change Agents are rare. ZYX analysis proposes Change Management training to develop new Change Agents as well as make existing good Change Agents better.

Implementation

ZYX analysis calls for managing a change initiative systematically in a manner similar to how major projects are managed. Good plans, good implementation, periodic reviews against pre-established goals and adjustments as needed. ZYX analysis provides a starting framework that should be customized for each situation. Organizational change is very personal to a lot of people, without customization for the situation any standard methodology based on any Change Management Theory is not likely to fully succeed.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. An analytical method of providing change management statistics in an organization which includes a plurality of individuals and machines, said method comprising the steps of:

creating one or more surveys from a computerized data base comprising a plurality of questions relating to change management subjects of Planning, Execution of the planning and Persons responsible for the execution of the planning, wherein said questions on Planning relate to vision, strategy and desired results, said questions on Execution relate to readiness, ambition, knowledge, ability and momentum, and said questions on Persons relate to conditioning, fear, trust and inductivity, and further, the questions relate to a general opinion relating to an entire organization and to a specific opinion relating to a respondent individual of the organization;

obtaining, by a computer, responses from the individuals in the organization to the plurality of questions relating to the general and specific opinions, wherein each obtained response ranges from 0 (zero) to 5 (five) wherein 0 is equivalent to "Do Not Know" and responses ranging from 1 to 5 indicate disagreement to agreement with the survey question;

the specifically configured and programmed computer calculating a weighted average of the specific and general responses wherein the average weighted specific response is used to further create the Specific Element Scores, by the computer, the Specific Element Scores having an assigned weight of the average weight of the specific responses to the at least one question relating to the specific opinion, and the average weighted general response is used to further create the General Element Scores by a computer specifically configured and programmed for the purpose, the General Element Scores having an assigned weight of the average weight of the general responses to the at least one question relating to the general opinion; and the specifically configured and programmed computer computing a plurality of indexes using the numerical values relating to at least two of the subjects, said plurality of indexes comprising:
- a Specific Planning Composite Index comprising a weighted average of the Specific Element Scores of the vision, strategy, and desired results elements;
- a General Planning Composite Index comprising a weighted average of the General Element Scores of the vision, strategy and desired results subjects; and
- a Planning Composite Index Delta, computed by subtracting the General Planning Composite index from the Specific Planning Composite Index.

2. The method of claim 1 wherein said step of obtaining responses includes a step of dividing the individuals in the organization into groups having one or more group members.

3. The method of claim 1, wherein the questions elicit information from each group member in the form of responses indicative of the opinion of the respondent on the subjects of vision, strategy, desired results, readiness, ambition, knowledge, ability, momentum, conditioning, fear, trust and inductivity.

4. The method of claim 1, wherein said calculating step involves analyzing general responses using assigned weights for rating answers by a specifically configured and programmed computer.

5. The method of claim 1 wherein the step of calculating further includes a step of using the Specific Element Scores to calculate Specific Indices by taking a weighted average of the Specific Elements Scores by a specifically configured and programmed computer.

6. The method of claim 5 wherein the Specific Indices include Specific Vision, Specific Strategy, Specific Desired Results, Specific Readiness, Specific Ambition, Specific Knowledge, Specific Fear, Specific Trust, Specific Inductivity, and Specific Conditioning by a specifically configured and programmed computer.

7. The method of claim 1 wherein the step of calculating further includes using the General Element Scores to calculate General Indices by taking a weighted average of the General Element Scores by a specifically configured and programmed computer.

8. The method of claim 7 wherein the General Indices include General Vision, General Strategy, General Desired Results, General Readiness, General Ambition, General Knowledge, General Fear, General Trust, General Inductivity, and General Conditioning.

9. The method of claim 1 wherein the step of calculating includes a step of taking a weighted average of the specific and general responses to produce an average weighted overall responses by a specifically configured and programmed computer.

10. The method of claim 9 wherein the step of calculating further includes a step of using the average weighted overall response to create Overall Element Scores, the Overall Element Scores having an assigned weight by a specifically configured and programmed computer.

11. The method of claim 10 wherein the step of calculating further includes a step of using the Overall Elements Scores to calculate Overall Indices by a specifically configured and programmed computer.

12. The method of claim 11 wherein the Overall Indices include Overall Vision, Overall Strategy, Overall Desired Results, Overall Readiness, Overall Ambition, Overall Knowledge, Overall Fear, Overall Trust, Overall Inductivity, and Overall Conditioning.

13. The method of claim 10 wherein the step of calculating further includes a step of creating an Overall Planning Composite Index by taking a weighted average of the Overall Element Scores of the vision, strategy and desired results elements by a specifically configured and programmed computer.

14. The method of claim 1 wherein the step of calculating further includes a step of creating a Specific Persons Composite Index by taking a weighted average of the Specific Elements Scores of the conditioning, fear, trust and inductivity subjects by a specifically configured and programmed computer.

15. The method of claim 14 wherein the step of calculating further includes a step of creating a General Persons Composite Index by taking a weighted average of the General Element Scores of the conditioning, fear, trust and inductivity subjects by a specifically configured and programmed computer.

16. The method of claim 15 wherein the step of calculating further includes a step of creating an Overall Persons Composite Index by taking a weighted average of the Overall Element Scores of the conditioning, fear, trust and inductivity subjects by a specifically configured and programmed computer.

17. The method of claim 16 wherein the step of calculating further includes a step of computing a Persons Composite Index Delta by subtracting the General Persons Composite Index from the Specific Persons Composite Index by a specifically configured and programmed computer.

18. The method of claim 17 wherein the step of calculating further includes a step of creating a Specific Execution Composite Index by taking a weighted average of the Specific Element Scores of the readiness, ambition, knowledge, ability and momentum subjects by a specifically configured and programmed computer.

19. The method of claim 18 wherein the step of calculating further includes a step of creating a General Execution Composite Index by taking a weighted average of the General Element Scores of the readiness, ambition, knowledge, ability and momentum subjects by a specifically configured and programmed computer.

20. The method of claim 19 wherein the step of calculating further includes a step of Overall Execution Composite Index by taking a weighted average of the General Element Scores of the readiness, ambition, knowledge, ability and momentum subjects by a specifically configured and programmed computer.

21. The method of claim 20 wherein the step of calculating further includes a step of computing an Execution Composite Index Delta by subtracting the General Execution Composite Index from the Specific Execution Composite Index by a specifically configured and programmed computer.

22. The method of claim 21 wherein the step of calculating further includes a step of computing a Specific Execution/Persons Composite Index by subtracting the Specific Persons Composite Index from the Specific Execution Composite Index by a specifically configured and programmed computer.

23. The method of claim 22 wherein the step of calculating further includes a step of computing a General Execution/Persons Composite Index by subtracting the General Persons Composite Index from the General Execution Composite Index by a specifically configured and programmed computer.

24. The method of claim 23 wherein the step of calculating further includes a step of computing an Overall Execution/

Persons Index by subtracting the Overall Persons Composite Index from the Overall Execution Composite Index by a specifically configured and programmed computer.

25. The method of claim 24 wherein the step of calculating further includes a step of computing an Execution/Persons Composite Index Delta by subtracting the General Execution/Persons Composite Index from the Specific Execution/Persons Composite Index by a specifically configured and programmed computer.

26. The method of claim 1 wherein said step of creating a survey includes creating at least one question that is duplicate of one of said questions, and said step of calculating includes calculating a conviction index based on the correspondence of the responses of each individual to said one question and said duplicate question and grouping the individuals by said conviction index by a specifically configured and programmed computer.

27. The method of claim 1, wherein said step of obtaining responses includes obtaining at least one general response relating to a general opinion relating to the entire organization and at least one specific response relating to a specific opinion relating to the respondent individual of the organization.

28. The method of claim 27 wherein said calculating step involves analyzing the specific responses using assigned weights for rating answers by a specifically configured and programmed computer.

* * * * *